United States Patent
Mui et al.

(10) Patent No.: US 7,149,003 B2
(45) Date of Patent: Dec. 12, 2006

(54) BI-DIRECTIONAL FLATBED SCANNING AND AUTOMATIC DOCUMENT FEED

(75) Inventors: Paul K. Mui, Boise, ID (US); Russell A. Mendenhall, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 872 days.

(21) Appl. No.: 09/858,312

(22) Filed: May 15, 2001

(65) Prior Publication Data
US 2002/0171877 A1 Nov. 21, 2002

(51) Int. Cl.
*H04N 1/04* (2006.01)
(52) U.S. Cl. ............... 358/474; 358/496; 358/497; 358/498
(58) Field of Classification Search ........... 358/474, 358/500, 496, 497, 505, 530, 538, 486, 494, 358/498
See application file for complete search history.

(56) References Cited

U.S. PATENT DOCUMENTS

| 3,786,416 | A | * | 1/1974 | Bhimani | 382/204 |
| 4,551,025 | A | * | 11/1985 | Ames et al. | 366/144 |
| 4,739,414 | A | * | 4/1988 | Pryor et al. | 358/482 |
| 5,452,108 | A | * | 9/1995 | Muramatsu | 358/474 |
| 5,796,928 | A | * | 8/1998 | Toyomura et al. | 358/1.6 |
| 6,323,961 | B1 | * | 11/2001 | Rackman | 358/448 |
| 6,452,636 | B1 | * | 9/2002 | Saito et al. | 348/383 |
| 6,646,768 | B1 | * | 11/2003 | Andersen et al. | 358/474 |
| 6,771,397 | B1 | * | 8/2004 | Hashizume | 358/474 |
| 6,804,414 | B1 | * | 10/2004 | Sakai et al. | 382/289 |
| 2001/0040703 | A1 | * | 11/2001 | Iseki et al. | 358/474 |
| 2002/0054715 | A1 | * | 5/2002 | Os et al. | 382/276 |
| 2003/0043418 | A1 | * | 3/2003 | Tsutsumi | 358/412 |

FOREIGN PATENT DOCUMENTS

JP 64-1370 1/1989

OTHER PUBLICATIONS

English translation of German Office Action dated Apr. 21, 2006.

* cited by examiner

*Primary Examiner*—Douglas Q. Tran
*Assistant Examiner*—Negussie Worku

(57) ABSTRACT

A method for scanning successive images including the steps of scanning a first image bearing media employing a top to bottom scan direction and scanning a second image bearing media employing a bottom to top scan direction.

8 Claims, 9 Drawing Sheets

BI-DIRECTIONAL FLATBED SCANNING AND AUTOMATIC DOCUMENT FEED

BACKGROUND OF THE INVENTION

1. Field of the Invention

The present invention relates generally to optical scanners and, more particularly to a method for bi-directional flatbed scanning and automatic document feed.

2. Background Art

Optical scanning and copying devices employ a method wherein data representative of a scanned object is produced by projecting an image of the scanned object onto an optical sensor. The optical scanning device may include scanner optics which may reduce the size of a projected image. The image of the scanned object is projected onto an optical sensor by linear increment by means of a moving scan line. The moving scan line is produced either by moving an image bearing media with respect to the scanner optical assembly or by moving the scanner optical assembly relative to an image bearing media. The optical sensor produce data representative of the intensity of the light projected thereon. These data may be digitized and stored on data storage media. Such stored data may be processed by a processing device to produce an image output or display.

Black and white or grayscale and some color optical scanning processes may require a single pass in order to acquire an image from which corresponding data is generated, processed and stored to produce an image of the object. Some color optical scanning processes require multiple passes in order to acquire multiple color component images from which corresponding data is generated and stored to produce a color image of the object. Typically data representative of red, green and blue component color images of the scanned object are produced and correlated for storage.

Various types of photosensor devices may be used in optical scanning devices. One such photosensor device is the charge coupled photosensor device or "CCD". A CCD creates an electrical charge in response to exposure to light. The magnitude of the electrical charge created is dependent on the intensity and the duration of the light exposure.

In optical scanning devices CCD cells are aligned in linear arrays. Each cell has a portion of a scan line image projected thereon as the scan line sweeps across a scanned object. The charge in each of the cells is measured and discharged at a "sampling interval". The direction parallel to the scan line movement relative to the object is the "scan direction". A scanner linear photosensor array includes a set of cells aligned in a "cross linear array", i.e. in a direction perpendicular to the scan direction. Each cell is defined by a width and a length, the width measured in the scan direction and the length measured in the cross linear direction. Scanners typically operate at a scanline sweep equal to one cell width per CCD sampling interval. At any time during a scanning operation, each cell in the CCD array includes an area that corresponds to an area of the object which is being imaged. This area of the CCD array is referred to herein as a "cross linear sampling". The corresponding area of the scanned object is referred to herein as an "object linear segment".

In flatbed optical scanning devices and copiers of the prior art, image bearing media is placed on a transparent platen and the carriage assembly scans the image from the top of the page to the bottom of the page while the image remains stationary on the transparent platen. When the top to bottom scan is complete, the carriage assembly returns to a top of the page position ready for the next top to bottom scan. In a black and white or one pass color scanning device, two traverses of the page length are required to scan a single image. In a multiple or three pass color scanning device, six traverses of the page length are required to scan a single image.

In a flatbed optical scanning device including an automatic document feed (ADF), image bearing media will be fed in repeated sequence for positioning on the flatbed for scanning and then on to an output document tray or document receiver. The carriage assembly repeatedly cycles from top to bottom and bottom to top scanning media in repeated sequence from the top of the page to the bottom of the page until such time as the ADF no longer contains media for feeding. The process repeats until the last image is scanned and then the carriage assembly returns to a top of the page position ready for the next scan job.

Processor operable image processing software processes digital data representative of the scanned image or images for storage, transmission, display, printing or other output.

It may be desirable to reduce the number of scanner carriage movement sequences by substantially 50 percent. It may be desirable to reduce scanning time by substantially 50 percent. It may also be desirable to increase the reliability of a scanning device by reducing total operation time for any given multi-page scanning task. It may also be desirable to improve long term scan and print quality by reducing the total mechanical stress over the life of the scanning device caused by vibration by reducing total operation time.

SUMMARY

The present invention is directed to a method for scanning an object including the steps of moving a first scanline relative to the object in a top to bottom scan direction, i.e. from the top of an image bearing media to the bottom of the image bearing media, followed by moving a second scanline relative to the object in a bottom to top scan direction, i.e. from the bottom of an image bearing media to the top of the image bearing media. An optical scanning device for producing machine-readable data representative of an object includes a transport assembly for moving a scanline relative to the object in a top to bottom scan direction from the top of the object to the bottom of the object. The transport assembly is also configured for moving the scanline relative to the object in a bottom to top scan direction from the bottom of the object to the top of the object. The optical scanning device also includes an imaging assembly operable in successive sampling intervals for generating a plurality of cross linear samplings image data representative of the object and a processing device responsive to a signal indicating a scan direction for selectively indexing a plurality of cross linear samplings in either a forward sequential order or a reverse sequential order.

In one preferred embodiment of the invention, the method for scanning an image includes the steps of feeding a first image bearing media through an automatic document feeding device to a flatbed scanner. The media is positioned on a transparent platen and the media is scanned from the top of the media to the bottom of the media. Once the carriage assembly reaches a top to bottom scan direction limit, the first image bearing media is transported off the platen and a second image bearing media is positioned on the transparent platen. The second media is scanned from the bottom to the top of the media, i.e. in a bottom to top scan direction. This sequence may be repeated until such time as the ADF no longer contains media to feed, or until such time as a stop scan command is provided by the scanning device controller.

Processor operable image data processing software indexes data representative of successive cross linear sampling.

For those images scanned from the top to the bottom of the media, typically even odd numbered images, or odd numbered scanning passes, each successive "cross linear sampling" is forward indexed in sequential order, i.e. $S_1$, $S_2$, $S_3$, ... $S_x$, where S is a cross linear sampling from 1 through X. When compiled, the image data order replicates the object.

For those images scanned from the bottom of the media to the top of the media, typically even numbered images, or even numbered scanning passes, each successive "cross linear sampling" is reverse indexed in reverse sequential order, i.e. $S_x$, $S_{x-1}$, $S_{x-2}$, $S_{x-3}$, ... $S_1$, where S is a cross linear sampling from X through 1. Once again, when compiled, the image data order replicates the object.

The invention substantially reduces the number of scanner carriage movements and the scanning time. Since the scanner carriage movement is reduced, the reliability of the system is improved because of less wear and tear. It also reduces the vibration impact on the printing system because of reduced carriage movement which improves print quality.

DESCRIPTION

Figure 1:
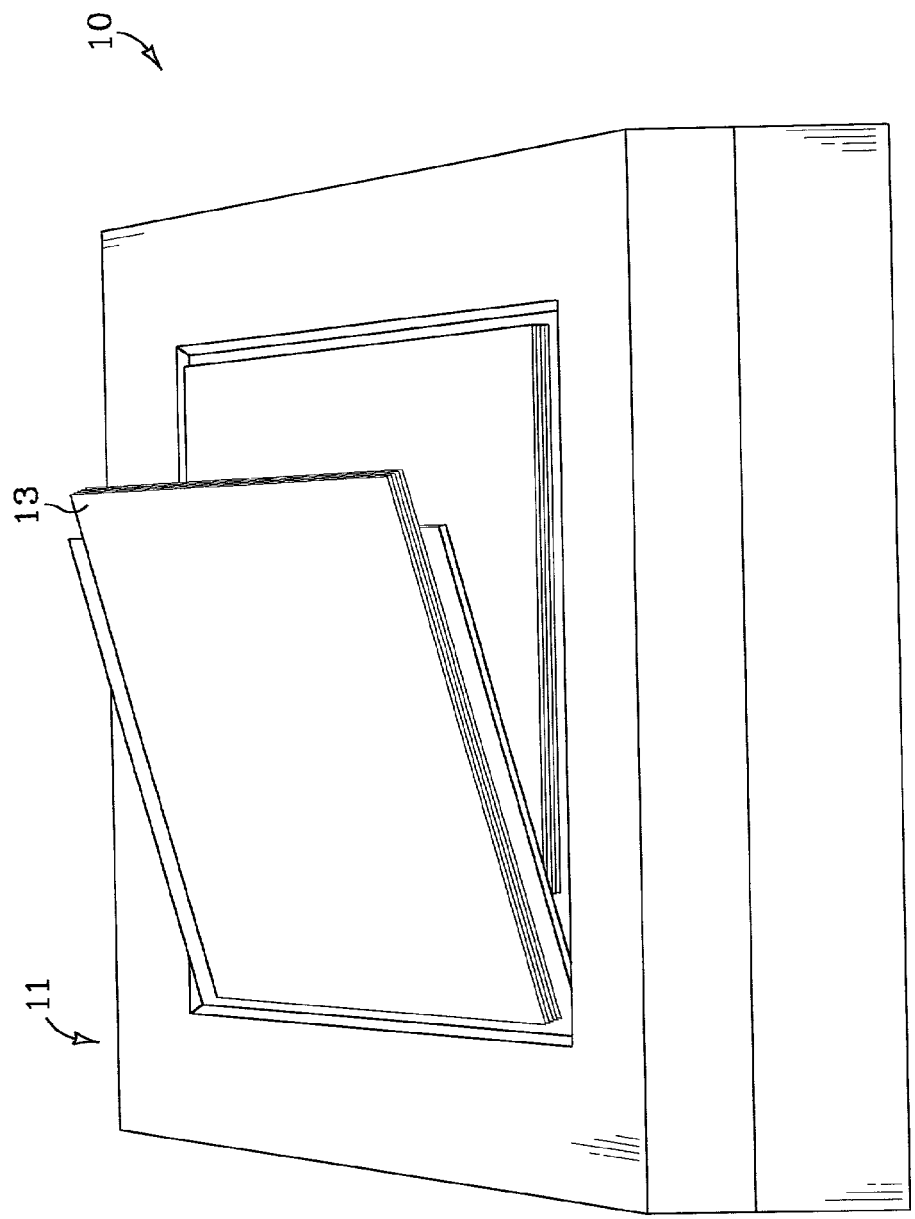
FIG. 1 is a representative perspective view of a flatbed scanning device including an automatic document feeder.
Figure 2:
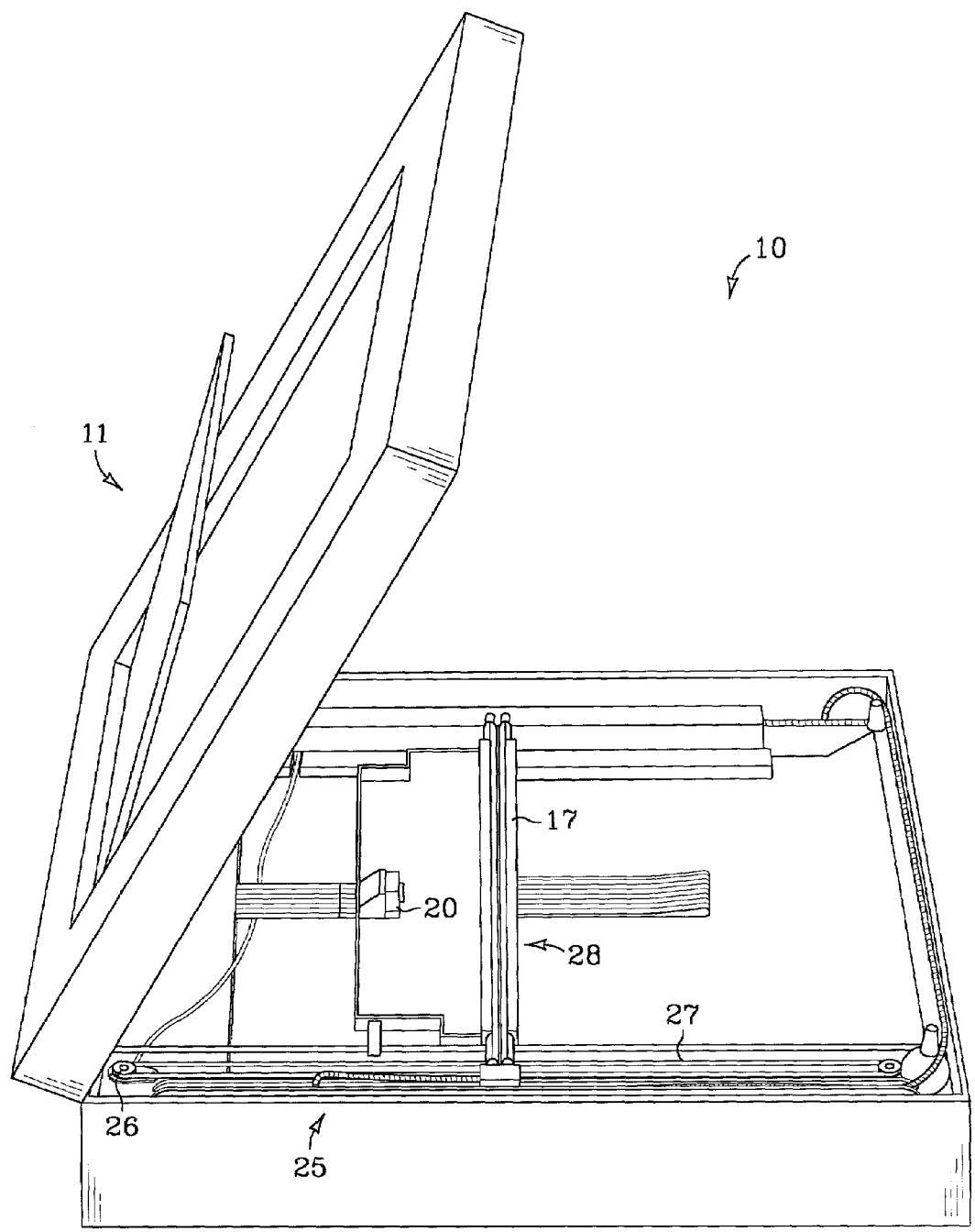
FIG. 2 is a representative perspective view of a flatbed scanning device including an automatic document feeder.
Figure 3:
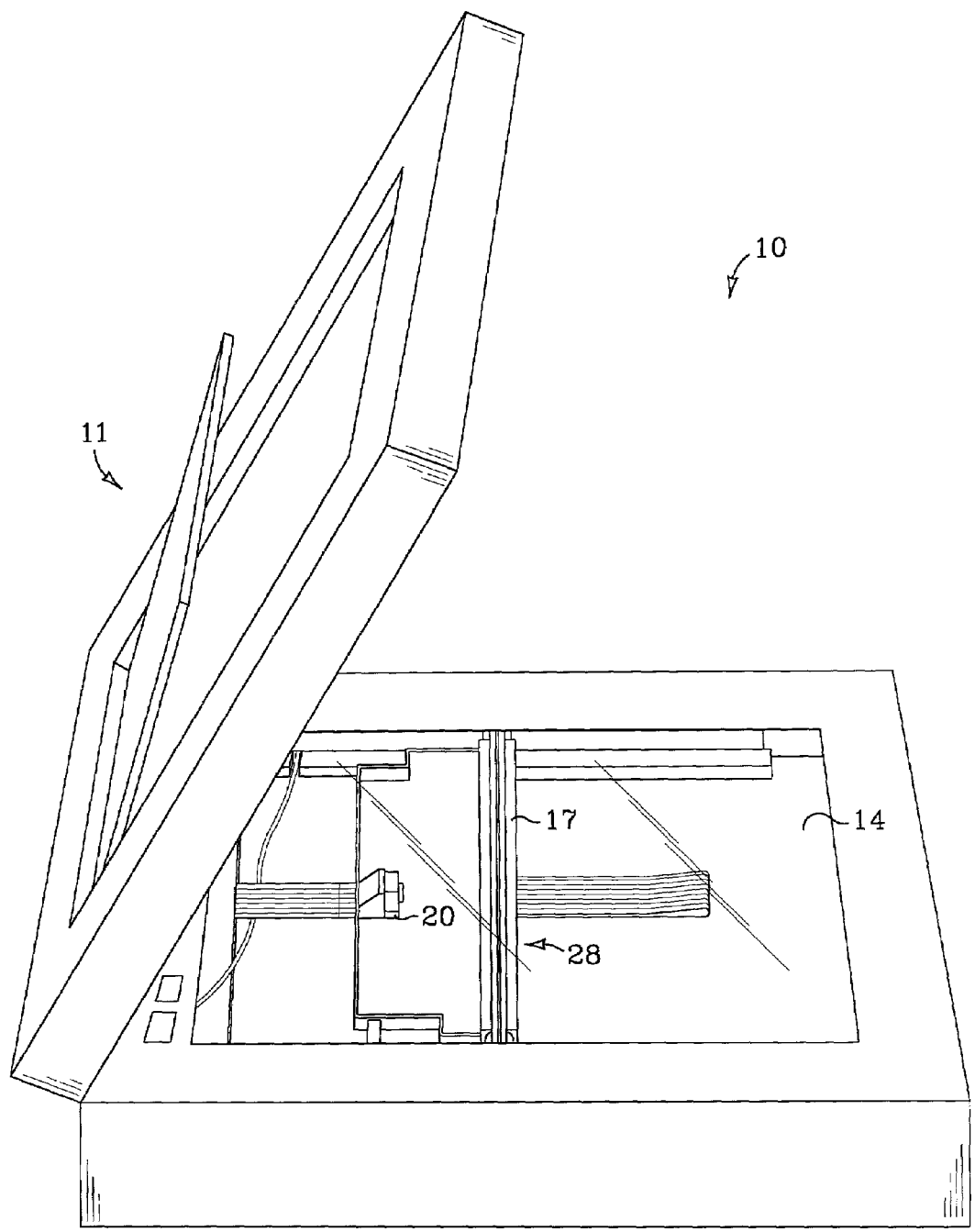
FIG. 3 is a representative perspective view of a flatbed scanning device including an automatic document feeder.

FIGS. 1 through 5 show optical scanning device 10 including automatic document feeder 11 which is adapted for producing machine readable data representative of a scanned object. In FIG. 1, automatic document feeder 11 is shown having image bearing media 13 positioned thereon for processing. As shown in FIGS. 2 through 5, optical scanning device 10 includes illumination assembly 17 which is supported and transported by carriage assembly 28 below transparent platen 14 (shown in FIGS. 3 through 5). Illumination assembly 17 reciprocatingly traverses below transparent platen 14 by operation of transport assembly 25 which includes motor 26, belt 27 and carriage assembly 28. Imaging assembly 20 is supported and transported by carriage assembly 28.

Figure 4:
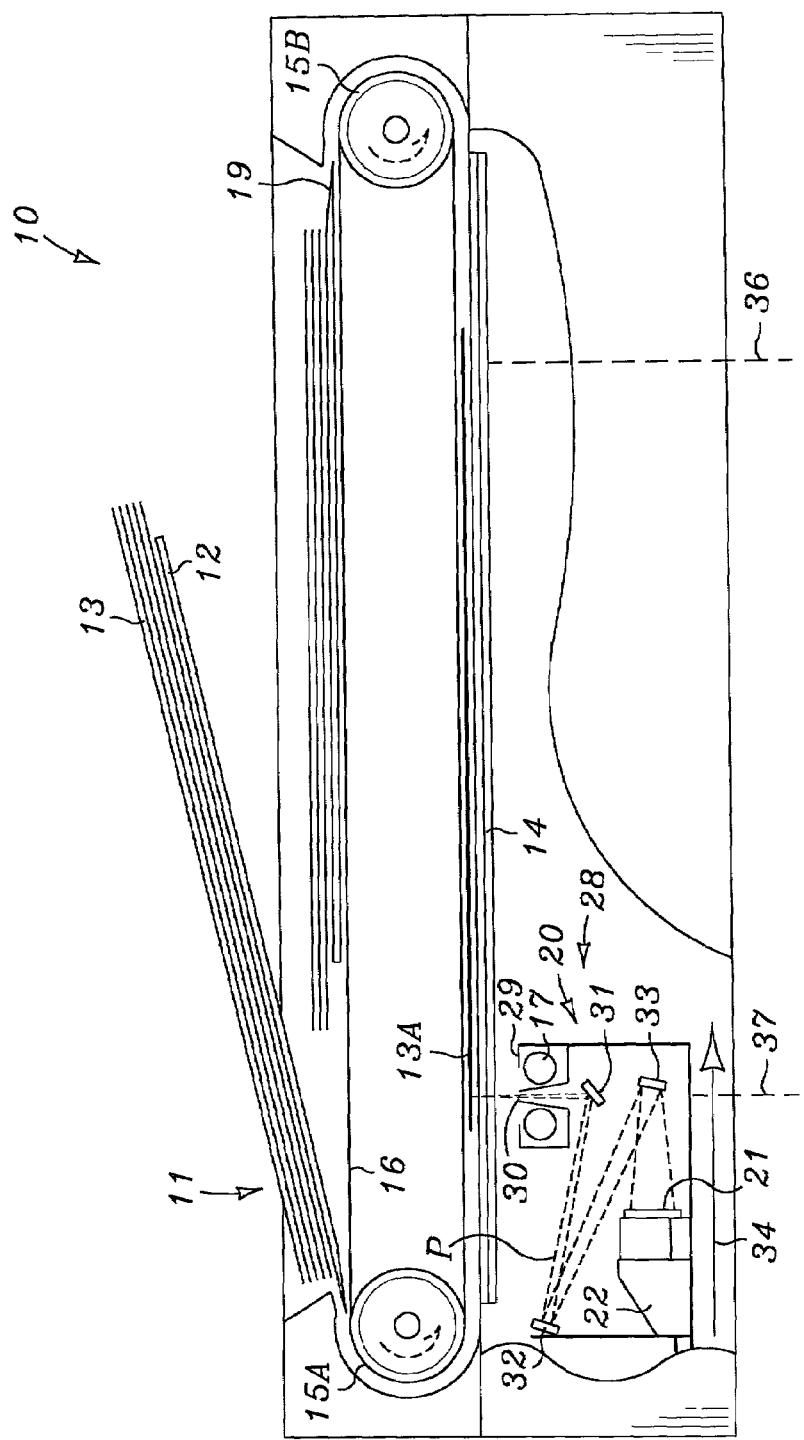
FIG. 4 is a side cutaway view of a flatbed scanning device including an automatic document feeder.
Figure 5:
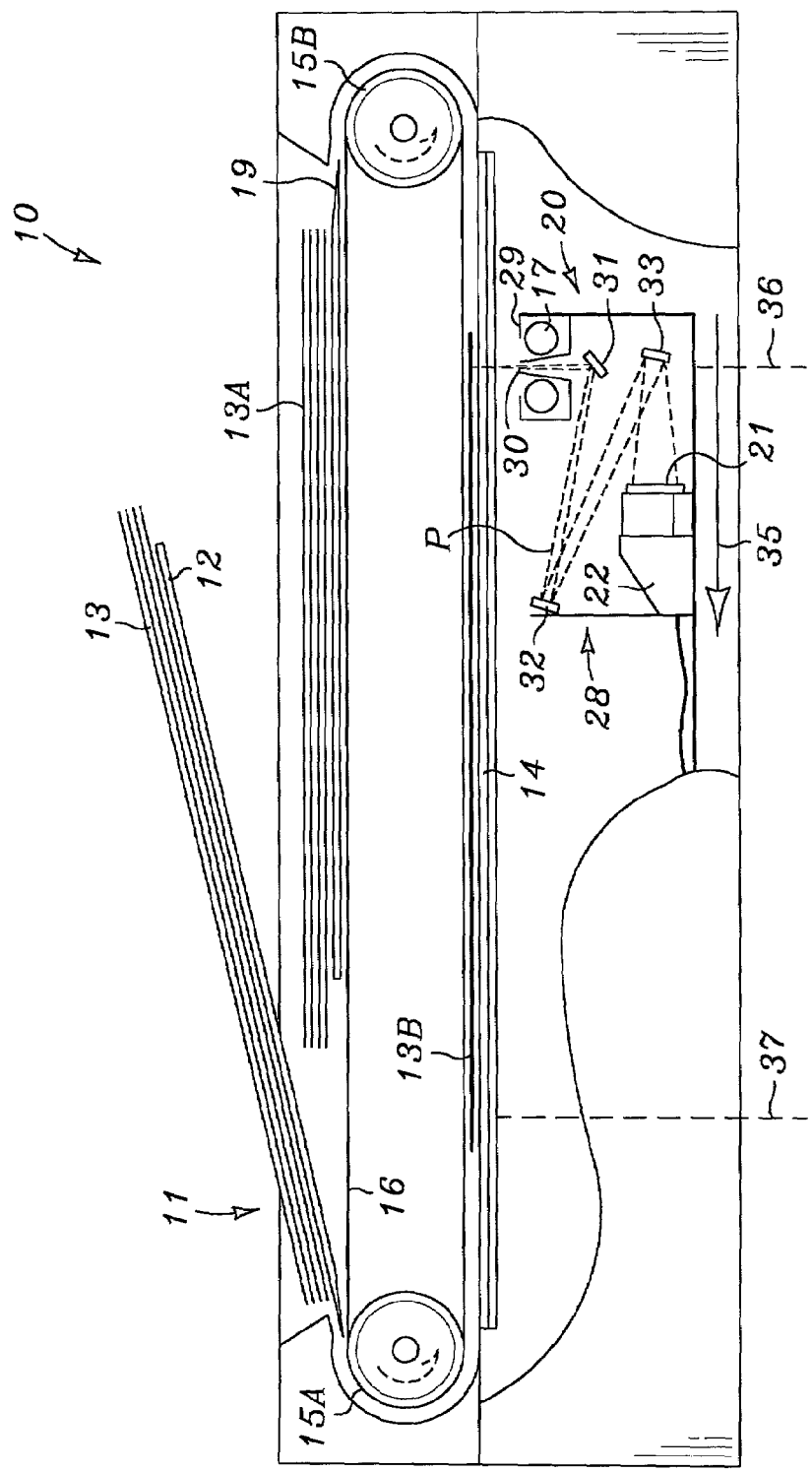
FIG. 5 is a side cutaway view of a flatbed scanning device including an automatic document feeder.

As seen in FIG. 4 and 5, optical scanning device 10 includes automatic document feeder 11 including paper tray 12 and rollers 15A and 15B which drive belt 16 for transporting image bearing media 13. Paper tray 12 supports image bearing media 13 to be transported across transparent platen 14. Optical scanning device 10 also includes receiver 19 for containing media following scanning. Carriage assembly 28 reciprocatingly traverses below transparent platen 14. Imaging assembly 20 is supported and transported by carriage assembly 28. Carriage assembly 28 includes illumination assembly 17 and body 29 defining aperture 30 through which light is reflected. Imaging assembly 20 includes mirrors 31, 32, 33 providing folded light path P. Folded light path P extends through aperture 30, to mirror 31, to mirror 32, to mirror 33, through optics 21 to photosensor 22. Photosensor 22 generates image data representative of image bearing media 13. Photosensor 22 may include grayscale or color data image capability.

As seen in FIG. 4, first image bearing media 13A is fed across transparent platen 14 by automatic document feeder 11 and carriage assembly 28 traverses beneath transparent platen 14 in top to bottom scan direction 34 scanning media 13A. When controller 42 (shown in FIG. 8), senses that carriage assembly 28 has initiated travel in top to bottom scan direction 34, imaging assembly 20 initiates the scan and sample cycle. Light is reflected by illuminated first image bearing media 13A through aperture 30 at mirrors 31, 32, 33 providing folded light path P extending through optics 21 to photosensor 22. Data representative of the intensity of light which is reflected by illuminated image bearing media 13A is generated by photosensor 22.

Figure 6:
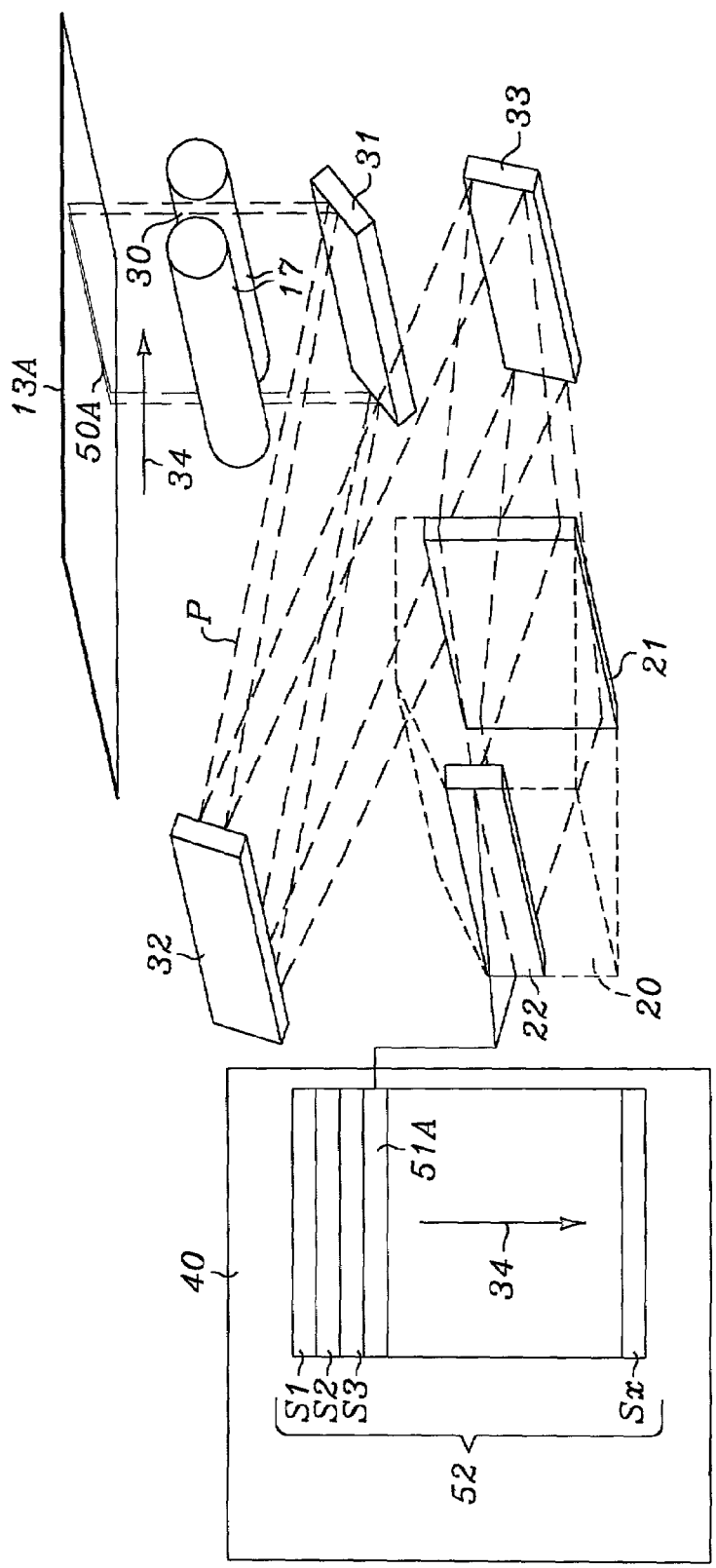
FIG. 6 is schematic diagram of a first scanned image section including a plurality of cross linear sampling $S_1$, $S_2$, $S_3$, ... $S_x$ compiled in a forward sequential indexing mode, the first scanned image section corresponding to a first object section.

FIG. 6 is a schematic representation of first image bearing media 13A including object scan line 50A corresponding with cross linear sampling 51A. Image data 52 includes a plurality of cross linear samplings indexed in forward sequential order, i.e. $S_1$, $S_2$, $S_3$, ... $S_x$. A scanner displacement of one scan line width, is represented by each cross linear sampling $S_1$, $S_2$, $S_3$, ... $S_x$. First image bearing media 13A is illuminated by illumination assembly 17. Light is reflected by illuminated first image bearing media 13A creating folded light path P extending through aperture 30, to mirror 31, to mirror 32, to mirror 33, through optics 21 of imaging assembly 20 to photosensor 22. Image data 52 representative of the intensity of light which is reflected by illuminated first image bearing media 13A is generated by photosensor 22. As shown in FIG. 6, processor 40 indexes image data 52 from photosensor 22 from successive cross linear samplings in forward sequential order, i.e., $S_1$, $S_2$, $S_3$, ... $S_x$.

Referring to FIG. 5, once carriage assembly 28 reaches top to bottom scan direction travel limit 36, first image bearing media 13A is transported off transparent platen 14 to receiver 19, second image bearing media 13B is positioned on transparent platen 14 by operation of automatic document feeder 11 and carriage assembly 28 reverses travel direction to bottom to top scan direction 35. Controller 42 (shown in FIG. 8), senses that carriage assembly 28 has initiated travel in bottom to top scan direction 35. Imaging assembly 20 initiates the scan and sample cycle. Light is reflected by illuminated second image bearing media 13B through aperture 30 at mirrors 31, 32, 33 providing folded light path P extending through optics 21 to photosensor 22. Data representative of the intensity of light which is reflected by illuminated second image bearing media 13B is generated by photosensor 22.

Figure 7:
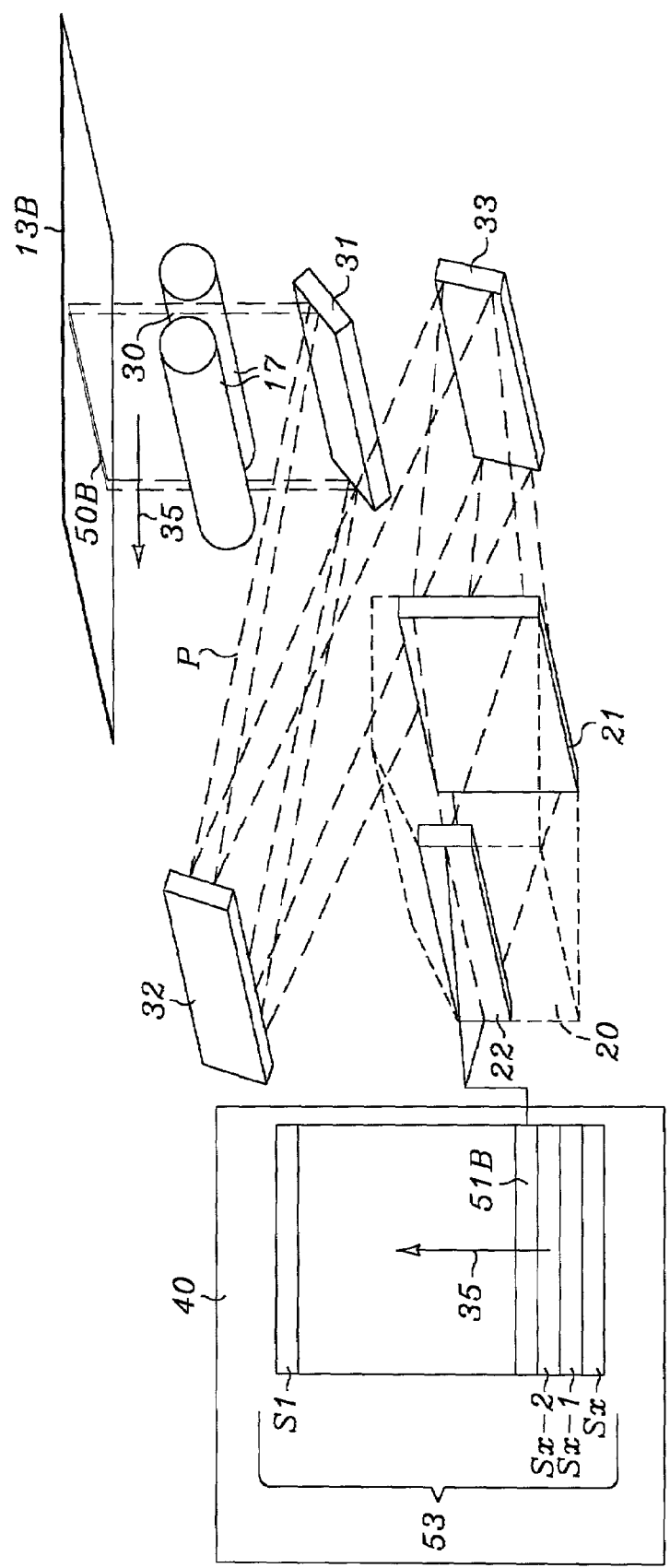
FIG. 7 is schematic diagram of a second scanned image section including a plurality of cross linear sampling $S_1$, $S_2$, $S_3$, ... $S_x$ compiled in a reverse sequential indexing mode, the second scanned image section corresponding to a second object section.

FIG. 7 is a schematic representation of second image bearing media 13B including object scan line 50B corresponding with cross linear sampling 51B. Image data 53 includes a plurality of cross linear samplings indexed in reverse sequential order, i.e. $S_x, S_{x-1}, S_{x-2}, S_{x-3}, \ldots S_1$. A scanner displacement of one scan line width, is represented by each cross linear sampling $S_x, S_{x-1}, S_{x-2}, S_{x-3}, \ldots S_1$. Second image bearing media 13B is illuminated by illumination assembly 17. Light is reflected by illuminated first image bearing media 13B through aperture 30 at mirrors 31, 32, 33 providing folded light path P extending through optics 21 to photosensor 22. Image data 53 representative of the intensity of light which is reflected by illuminated first image bearing media 13B is generated by photosensor 22. As shown in FIG. 7, processor 40 indexes image data 53 from photosensor 22 from successive cross linear samplings in reverse sequential order, i.e., $S_x, S_{x-1}, S_{x-2}, S_{x-3}, \ldots S_1$.

Once carriage assembly 28 reaches bottom to top scan direction limit 37, second image bearing media 13B is transported off transparent platen 14 to receiver 19, a third image bearing media (not shown) is positioned on transparent platen 14 by operation of automatic document feeder 11 and the previously described sequence may be repeated until such time as controller 42 (shown in FIG. 8), senses that paper tray 12 no longer contains image bearing media 13 to be fed by automatic document feeder 11, or until such time as a stop scan command is provided by controller 42.

Figure 8:
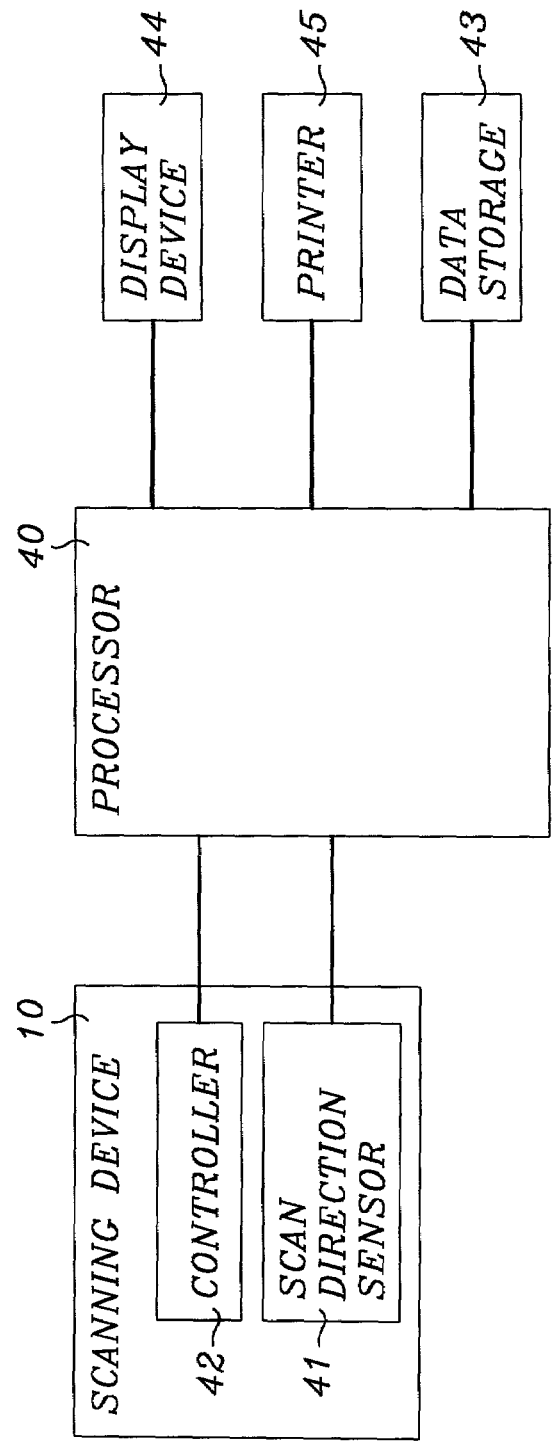
FIG. 8 is a block diagram illustrating a scanning device according to the present invention.

As shown in FIG. 8, optical scanning device 10 may also include or may be connected to a data processor 40, for example a personal computer, for processing data from photosensor 22. One arrangement includes scanning device 10 including controller 42 and a scan direction sensor 41 connected to data processor 40. Data processor 40 is connected to data storage 43, display device 44 and printer 45.

Figure 9:
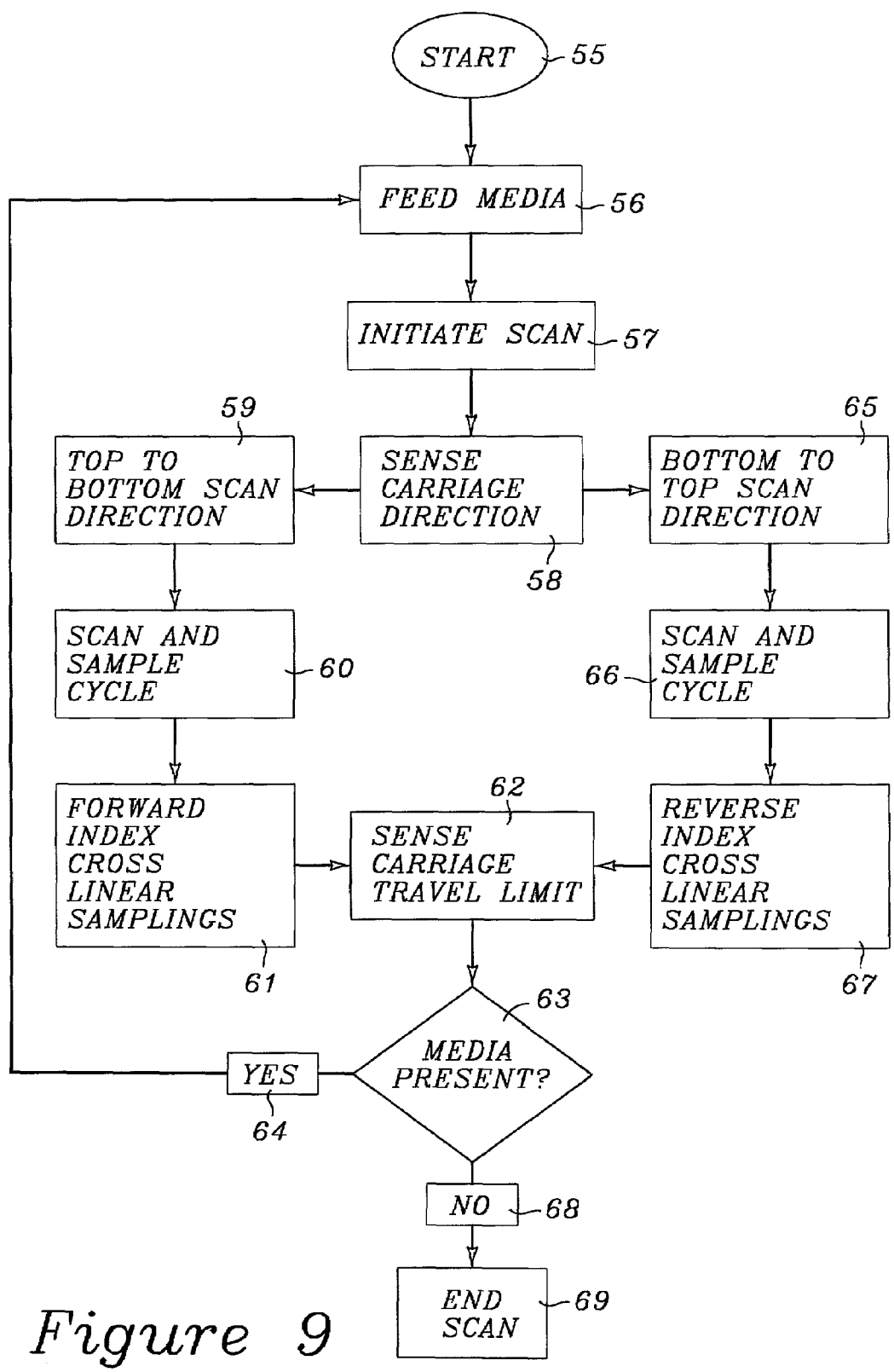
FIG. 9 is a flow chart depicting the steps of a method for bi-directional flatbed scanning and automatic document feed.

FIG. 9 is a flow chart depicting the steps of a method for bi-directional flatbed scanning and automatic document feed. The process is initiated at START 55. Media is fed by an automatic document feeder at FEED MEDIA 56 and a scanning operation initiates at INITIATE SCAN 57. The controller senses the direction of carriage assembly movement at SENSE CARRIAGE DIRECTION 58. A top to bottom scan direction is sensed at TOP TO BOTTOM SCAN DIRECTION 59 and scan/sampling process begins at BEGIN SAMPLING 60. Each successive cross linear sampling is forward indexed at FORWARD INDEX CROSS LINEAR SAMPLINGS 61. When device controller senses a top to bottom scan direction limit at SENSE CARRIAGE TRAVEL LIMIT 62, the controller queries the ADF to sense the presence of additional media for scanning at MEDIA PRESENT? 63. If media is present as indicated at YES 64, the process returns to FEED MEDIA at 56.

Scanning operations initiate once again at INITIATE SCAN 57. The controller senses the direction of carriage assembly movement at SENSE CARRIAGE DIRECTION 58, and a bottom to top scan direction is sensed at BOTTOM TO TOP SCAN DIRECTION 65. The scan/sampling process begins at BEGIN SAMPLING 66 and each successive cross linear sampling is reverse indexed at REVERSE INDEX CROSS LINEAR SAMPLINGS 67. When device controller senses the travel limit at SENSE CARRIAGE TRAVEL LIMIT 62, the controller queries the ADF to sense the presence of additional media for scanning at MEDIA PRESENT? 63. If media is not present, as indicated at NO 68, the process ends the scan operation at END SCAN 69.

While this invention has been described with reference to the detailed embodiments, this is not meant to be construed in a limiting sense. Various modifications to the described embodiments, as well as additional embodiments of the invention, will be apparent to persons skilled in the art upon reference to this description. It is therefore contemplated that the appended claims will cover any such modifications or embodiments as fall within the true scope of the invention.

What is claimed is:

1. A method of scanning an object including the steps of:
    moving a first scan line during scanning relative to the object in a top to bottom scan direction;
    indexing a plurality of cross linear samplings in a forward sequential order;
    moving a second during scanning scanline relative to the object in a bottom to top scan direction; and
    indexing a plurality of cross linear samplings in a reverse sequential order.

2. The method of scanning an image of claim 1 wherein the object further comprises an image bearing media.

3. A method of scanning image bearing media with an optical scanning device including the steps of:
    scanning a first image bearing media in a top to bottom scan direction;
    indexing a plurality of cross linear samplings in a forward sequential order;
    scanning a second image bearing media in a bottom to top scan direction; and
    indexing a plurality of cross linear samplings in a reverse sequential order.

4. The method of scanning image bearing media of claim 3 including the steps of:
    feeding the first image bearing media from an automatic document feeding device to the scanning device; and
    feeding the second image bearing media from the automatic document feeding device to the scanning device.

5. A method of scanning image bearing media with a flatbed optical scanning device including the steps of:
    feeding a first image bearing media from an automatic document feeding device to a flatbed scanning device;
    scanning the first image bearing media in a top to bottom scan direction;
    indexing a plurality of cross linear samplings in a forward sequential order;
    feeding a second image bearing media from the automatic document feeding device to the scanning device;
    scanning the second image bearing media in a bottom to top scan direction; and
    indexing a plurality of cross linear samplings in a reverse sequential order.

6. The method of scanning image bearing media of claim 5 including the step of sensing a carriage assembly travel direction.

7. The method of scanning image bearing media of claim 5 including the step of sensing a carriage assembly travel limit.

8. An optical scanning device for producing machine-readable data representative of an object comprising:
    a scanner controller;
    a transport assembly connected to the scanner controller for moving a scanline relative to the object in a top to bottom scan direction followed by moving the scanline relative to the object in a bottom to top scan direction;

an imaging assembly connected to the scanner controller and operable in successive sampling intervals for generating a plurality of cross linear samplings image data representative of the object;

an automatic document feeder connected to the scanner controller and operable in response to the scanner controller;

a processing device responsive to a scan direction travel limit for selectively indexing a plurality of cross linear samplings in a forward sequential order; and a processing device responsive to a scan direction travel limit for selectively indexing a plurality of cross linear samplings in a reverse sequential order.

* * * * *

UNITED STATES PATENT AND TRADEMARK OFFICE
CERTIFICATE OF CORRECTION

| | | |
|---|---|---|
| PATENT NO. | : 7,149,003 B2 | Page 1 of 1 |
| APPLICATION NO. | : 09/858312 | |
| DATED | : December 12, 2006 | |
| INVENTOR(S) | : Paul K. Mui et al. | |

It is certified that error appears in the above-identified patent and that said Letters Patent is hereby corrected as shown below:

In column 6, line 18, in Claim 1, after "second" insert -- scanline --.

In column 6, line 18, in Claim 1, after "scanning" delete "scanline".

Signed and Sealed this

Fifth Day of May, 2009

JOHN DOLL
*Acting Director of the United States Patent and Trademark Office*